United States Patent [19]

Breiner

[11] Patent Number: 5,318,391
[45] Date of Patent: Jun. 7, 1994

[54] WORK HOLDER FOR MODIFYING AN AUTOMATIC TRANSMISSION AND METHOD THEREFOR

[75] Inventor: James S. Breiner, Citrus Heights, Calif.

[73] Assignee: Linda L. Breiner, Rocklin, Calif.

[21] Appl. No.: 911,876

[22] Filed: Jul. 10, 1992

[51] Int. Cl.⁵ .......................................... B23B 47/28
[52] U.S. Cl. ...................................... 408/103; 269/47; 269/87.3; 269/88; 408/79; 408/97; 408/115 R
[58] Field of Search ............... 408/79, 97, 103, 115 R; 269/87.3, 47, 52, 88; 29/401.1

[56] References Cited

U.S. PATENT DOCUMENTS

| 907,735 | 12/1908 | Cain, Jr. | 408/97 |
|---|---|---|---|
| 1,946,421 | 2/1934 | Brown, Jr. | 408/115 X |
| 2,365,068 | 12/1944 | Gerbig | 29/26 |
| 2,471,940 | 5/1949 | Dion | 77/63 |
| 2,645,140 | 7/1953 | Meilstrup | 408/97 |
| 2,961,900 | 11/1960 | Stanton et al. | 269/87.3 X |
| 3,211,026 | 10/1965 | Calahan | 408/103 |
| 3,280,661 | 10/1966 | Robertson | 77/62 |
| 3,473,420 | 10/1969 | Boggs | 77/63 |
| 3,713,747 | 1/1973 | Haselmo | 408/115 |
| 4,461,603 | 7/1984 | Klee et al. | 408/115 R |
| 4,579,485 | 4/1986 | Connor et al. | 408/115 R |
| 4,955,766 | 9/1990 | Sommerfeld | 408/87 |
| 4,993,895 | 2/1991 | Nordstrom | 408/103 |
| 5,056,966 | 10/1991 | Lee | 408/115 R |
| 5,069,093 | 12/1991 | Carswell | 82/1.11 |

OTHER PUBLICATIONS

Motor; Domestic Transmission Manual; 1986, pp. 8-5 through 8-8.
Transmission Digest; Technically Speaking; 1992, p. 34.

Primary Examiner—Joseph M. Gorski
Attorney, Agent, or Firm—Bernhard Kreten

[57] ABSTRACT

A work holder is provided for modifying an automatic transmission such that clutch pistons within the automatic transmission receive a unidirectional valve therethrough rather than the associated clutch drum as is typically the case. The work holder includes a base with a horizontal upper surface having a central disk which is sized to fit and retain one clutch piston to the base when the central disk is in one orientation and another clutch piston when the central disk is in another orientation. With the clutch piston securely attached to the work holder, a drill bit guide mounted on the work holder directs a stepped drill bit so that it may bore a hole through the clutch piston for passage of hydraulic fluid therethrough. Two drill bit guides are provided, one for each clutch piston, which each direct one of two of the drill bits to the appropriate location. Once the holes are drilled in each clutch piston a check ball and seat combination are located within each hole thus made. Finally, the existing hole in the clutch drum is drilled out and plugged. The work holder provides quick and precise modification of the clutch pistons of an automatic transmission for improved performance and durability of the automatic transmission.

3 Claims, 4 Drawing Sheets

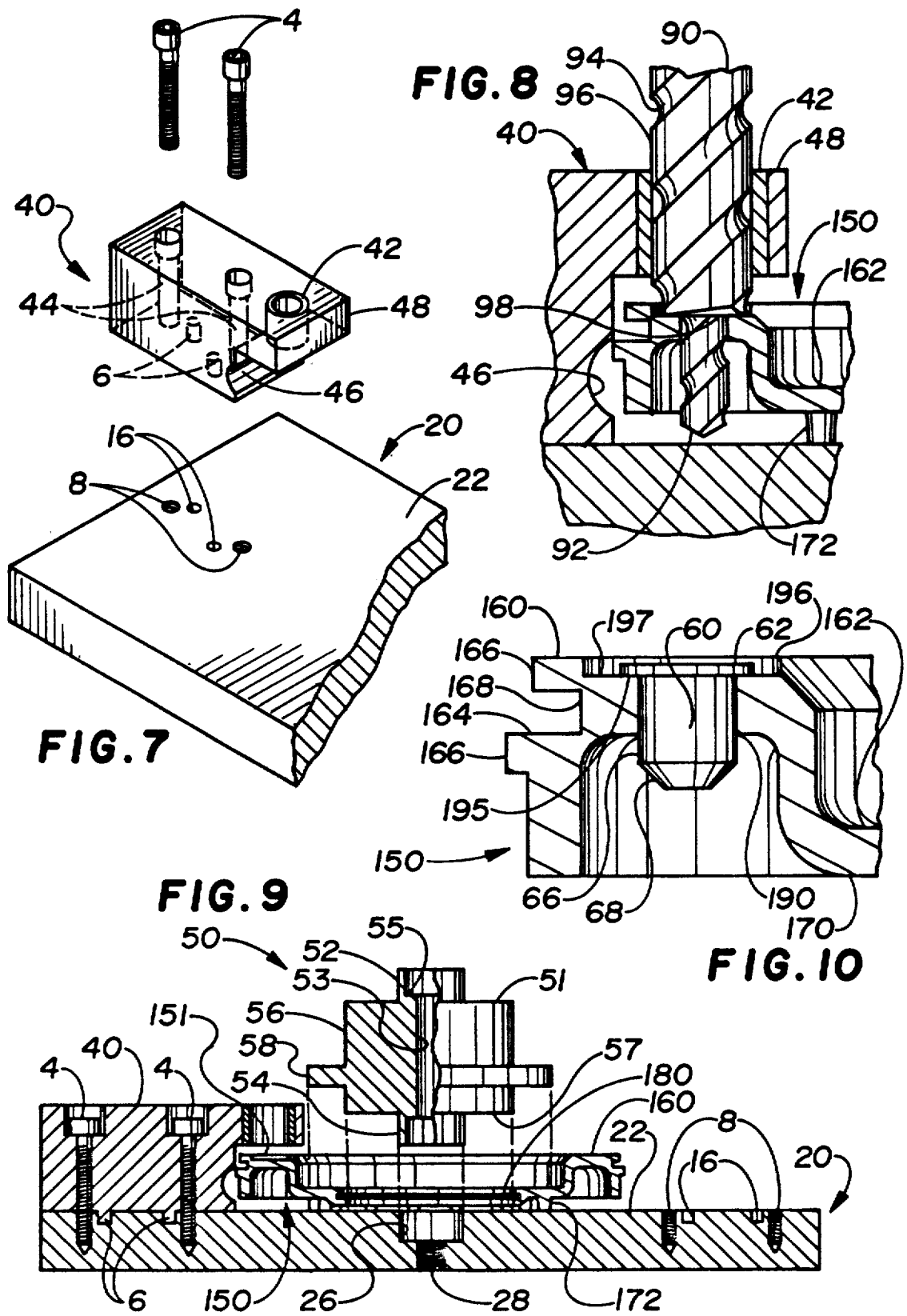

WORK HOLDER FOR MODIFYING AN AUTOMATIC TRANSMISSION AND METHOD THEREFOR

FIELD OF THE INVENTION

The following invention relates to work holders for machining of parts. More specifically, this invention relates to work holders for precision drilling of holes through metal automotive parts such as clutch pistons found within automatic transmissions and methods for modifying automatic transmissions.

BACKGROUND OF THE INVENTION

Automatic transmissions have been established in the automotive industry as a major way to transmit power from an internal combustion engine to wheels of an automobile with a torque and angular velocity which drives the automobile in a manner desired by the vehicle operator. The primary advantage of the automatic transmission over a manual transmission is that the automatic transmission relieves the vehicle operator from the requirement of manually shifting gears and operating a clutch while driving the vehicle.

While there are various nuances to automatic transmission operation, this application is concerned primarily only with a modification to existing automatic transmissions. Thus, details of automatic transmission structure and operation are omitted to the extent that they do not directly affect a thorough explanation of the invention described herein.

Automatic transmissions have often exhibited failure rates which are more frequent than failure rates of other types of transmissions. Furthermore, as a general rule, the repair costs involved in automatic transmission failures have exceeded the cost of repair for other types of transmissions. One common source of automatic transmission failure is through blowout of check balls located within clutch drums of the automatic transmission. (Clutch drums are also referred to as clutch liners in some publications).

One fairly common configuration of an automatic transmission (exhibited for example in the turbo hydromatic 350 automatic transmission manufactured by General Motors) including a clutch drum having a hole passing therethrough with a check ball located within the hole. The hole is staked on an end adjacent a clutch piston to prevent the ball from exiting the hole. The hole and check ball are provided so that hydraulic fluid can enter a small gap between the clutch piston and the clutch drum but can not escape through the same hole. When the hydraulic pressure is of a sufficient value, the hydraulic fluid can cause the clutch piston to move away from the clutch drum. The net effect is to apply the clutch and cause the automatic transmission to shift to a different gear ratio.

In this check ball configuration, the automatic transmission often fails by having the staked portion of the clutch drum break away allowing the check ball to enter the region between the clutch drum and the clutch piston. The tight clearances and high rotational velocities of the clutch drum and clutch piston allow the clutch ball to severely damage the clutch drum and the clutch piston. Furthermore, without the check ball in place hydraulic pressure cannot be maintained on the clutch piston and so at least one gear of the automatic transmission is disabled. Repair after this type of failure is a fairly expensive procedure which requires replacement of the clutch drum at a minimum.

The device of this invention is utilizable to easily modify an automatic transmission having a configuration such as that of the turbo hydra-matic 350 transmission to prevent failure of the check ball. The applicant's device relocates the hole and check ball within the clutch piston. The new hole is drilled and fitted with a check ball and seat apparatus which is more durable in construction than the staked-in check ball utilized by existing automatic transmissions such as the turbo hydra-matic 350 transmission. The replacement check ball and seat are less likely to fail. Furthermore, if failure should occur, the repair of the transmission will require replacement of the clutch piston rather than the clutch drum. Replacement of the clutch piston is a less expensive procedure than replacement of a clutch drum.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| INVENTOR | U.S. PAT. NO. | ISSUE DATE | |
|---|---|---|---|
| Gerbig, S.A. | 2,365,068 | December 12, 1944 | |
| Dion, E. | 2,471,940 | May 31, 1949 | |
| Robertson, H.P. | 3,280,661 | October 25, 1966 | |
| Boggs, B.A. | 3,743,420 | October 21, 1969 | |
| Haselmo, R.D. | 3,713,747 | January 30, 1973 | |
| Klee et al. | 4,461,603 | July 24, 1984 | |
| Sommerfeld, C.A. | 4,955,766 | September 11, 1990 | |
| Nordstrom, E. | 4,993,895 | February 19, 1991 | |
| Lee, R.C. | 5,056,966 | October 15, 1991 | |
| Carswell, C.W. | 5,069,093 | December 3, 1991 | |
| OTHER PRIOR ART | | | |
| Arthur, | Title | Pertinent Pages | Year |
| Transmission Digest | "Technically Speaking" | Page 34 | 1992 |
| Motor | "Domestic Transmission Manual" | Page 8-1 et seq. | 1986 |

The patent to Sommerfeld teaches the use of a holding fixture for drilling pocket joints from wooden pieces. It includes a vise-like structure for securely holding the piece to be drilled, a guide portion which supports the drill in the desired alignment and a stepped drill bit. The device of this application is distinguishable from Sommerfeld in that, inter alia, it is specifically designed to securely hold a clutch piston of an automatic transmission. Furthermore, the device of this application is designed for use in metalworking on high precision automotive parts which require the maintenance of precise tolerances in drilling the hole. The device taught by Sommerfeld shows an angled drill bit guide which directs the drill bit against the piece to be drilled at a non-orthogonal angle. In precision metalworking this type of an angular hole is not effectively accurately drilled even with a guide for the drill bit.

The patent to Dion teaches the use of an all purpose work holder to be utilized with a drill press. The device of the instant invention is distinguishable from Dion in that it includes a drill bit guide to ensure that the hole to be drilled is precisely located without the prior art's requirement of carefully adjusting a base of the device with respect to a table of the drill press.

The article under the column entitled "Technically Speaking" in Transmission Digest, page 34 describes the hole located in the piston retainer (i.e. clutch drum) and describes the problem of blowout of a small orifice screen due to it not being staked properly in manufacture and the result involved when the screen blows out. The screen blow out problem shares similarities with the problem of check ball blow out. While this article clearly describes the problem existing in many automatic transmissions this article does not address remedies to the problem or any methods of correcting the problem as does the method disclosed by this invention.

The book *Domestic Transmission Manual* published by Motor teaches at Page 8-1 et seq. the use of a C3 and C4 automatic transmission by the Ford Motor Corporation. These transmissions are characterized by having check balls located within the clutch piston which parallel the same end result achieved by the device of the instant invention. However, the instant invention is distinguishable in that it is a work holder and method for modifying a transmission to have a configuration similar to that taught by Motor. Motor teaches no such modification apparatus or procedure.

The other prior art listed above but not specifically described teach other devices for various machining operations and further catalog the prior art of which the applicant is aware. These references diverge even more starkly from the references specifically distinguished above.

SUMMARY OF THE INVENTION

The work holder of this invention is used to hold the clutch piston securely in place so that a hole having a precise shape and location may be drilled into the clutch piston. The work holder is somewhat polymorphic in that it can be reconfigured to securely hold various different clutch pistons from the same or different transmissions with little modification. The work holder consists primarily of four separate components. These components include a base, a central disk, a forward guide and a direct guide. The forward guide is used principally to modify a piston of an automatic transmission which locks the forward clutch of the automatic transmission (hereafter referred to as the forward clutch piston). The direct guide is used principally to modify the clutch piston which locks the direct clutch within the automatic transmission (this piston is hereafter referred to as the direct clutch piston). The central disk has two orientations for holding clutch pistons securely to the base. A first position allows the central disk to hold the forward clutch piston to the base and the second position allows the central disk to securely hold the direct clutch piston to the base.

More specifically, the base is a solid construct having a flat upper surface and a flat lower surface which can securely contact a flat surface upon which it rests. The flat upper surface of the base has a centrally located recess of cylindrical shape located therein. A bottom flat surface of the cylindrical recess has a threaded hole centrally located therein. The recess is utilized to restrain the central disk from horizontal translation and the threaded hole is designed to prevent vertical displacement of the central disk as will be discussed below.

Two threaded holes are located on each side of the recess establishing all five threaded holes in the recess in a collinear arrangement. The pairs of threaded holes on each side of the recess are located such that they extend into the upper surface of the base in a vertical orientation and sufficiently outboard away from the recess to be clear of an outer periphery of a clutch piston which is aligned centrally over the recess. Each pair of threaded holes outside the recess has located therebetween two non-threaded holes which are not collinear with the threaded holes and the recess. Thus, each side of the upper surface of the base has two threaded holes and two non-threaded holes in rather close proximity.

The forward guide is a solid construct having a flat bottom surface and a flat top surface. The bottom surface of the forward guide has two holes and two posts. The two holes are located a similar distance apart and have a width similar to a width of the threaded holes on one side of the recess. These holes pass entirely through the forward guide such that bolts may pass through the upper surface of the guide and into the threaded holes of the base to securely attach the forward guide to the base. The posts located on the bottom surface are positioned to extending below the flat bottom surface of the forward guide such that when the bottom surface of the forward guide is located adjacent the upper surface of the base the posts fit within the non-threaded holes of the upper surface. In this way, the forward guide is held securely to the base without lateral stress on the bolts.

The direct guide has a similar outline as that of the forward guide. Two holes in a bottom surface of the direct guide are located in a similar pattern to the two threaded holes which are on an opposite side of the recess on the upper surface of the base. Bolts may be utilized to securely attach the direct guide to the upper surface of the base. Posts are provided which extend from the bottom surface of the direct guide and into the two non-threaded holes.

Each guide has an overhang which causes the flat upper surface of the guides to extend closer to the recess than do bottom surfaces of the guides. Each overhang has a flat upper surface and a flat lower surface. A cylindrical hole is passed vertically through each overhang which is specifically located and sized to receive a drill bit which will impact a clutch piston resting concentrically with the cylindrical recess on the upper surface of the base.

Thus, when the forward clutch piston is located on the upper surface of the base the forward guide receives a drill bit which will precisely locate a desired hole in the forward clutch piston. Likewise, when the direct clutch piston is located on the upper surface of the base, the direct guide receives a drill bit which will precisely locate a hole in the direct guide for modification of the direct clutch piston.

Each clutch piston is held securely to the base by the central disk. The central disk is a radially symmetrical construct which is primarily cylindrical in form. A cylindrical hole passes entirely through the central disk in an orientation orthogonal to flat ends of the central disk. The hole is located along a central axis of the central disk. The hole is sized similar to the threaded hole located in the bottom of the recess of the base. Thus, a threaded bolt may pass through the central hole of the central disk and firmly hold the central disk to the base.

A cylindrical shroud extends perpendicularly from each flat surface of the central disk in a location surrounding the central hole. Each shroud is a hollow cylindrical extension having an outer diameter which is similar to a diameter of the recess in the base. Thus, when the central disk is located adjacent the base one of the shrouds fit snugly within the recess and the adjacent flat surface of the central disk is located adjacent the upper surface of the base.

An annulus extends radially outwardly from the curved side surface of the central disk a constant distance entirely around the central disk. The annulus is located closer to one flat surface of the central disk than to the opposite flat surface of the central disk. A distance between the annulus and a first flat surface of the central disk is similar to a distance between a top surface of a clutch piston and a bottom surface of that clutch piston. Therefore, when that clutch piston is placed on the upper surface of the base concentric with the recess, the central disk may be located inside a central hole of the clutch piston with the annulus adjacent the top surface of the clutch piston and with the shroud extending into the recess of the base.

The height of the central disk and location of the annulus are selected such that when one shroud of the central disk is located within the recess the central disk is configured to hold a forward clutch piston and when an opposite shroud of the central disk is located within the recess of the base the annulus is positioned to hold down a direct clutch piston (or some other part) from the same or a different transmission.

Each clutch piston is described generally as being a substantially radially symmetrical disk-like construct having a large central bore located therein. Each clutch piston is characterized as having a fairly thin cross-sectional thickness. An upper surface of each clutch piston (often described as an apply side of the clutch piston) is the side of the clutch piston which receives increased hydraulic pressure immediately before application of the clutch by movement of the clutch piston. A bottom surface of each clutch piston is defined by a side of the clutch piston opposite the upper (or apply) side of the clutch piston.

The diameter of the central disk is sized to conform to the large bore of the clutch pistons. On some transmissions the central bores of the direct clutch piston and the forward clutch piston may be of different diameters. When this is the case, the central disk may be formed having a different diameter on opposite sides of the annulus to conform to the diameters of the inner bore of each clutch piston to be held.

Each clutch piston is modified by having a hole drilled through the clutch piston from the top surface through to the bottom surface. The hole is drilled such that a seat and associated check ball entrained within the seat may be placed into the hole. The seat is configured such that when hydraulic fluid is being directed through the clutch piston from the bottom surface to the top surface fluid is allowed to pass around the ball. But when pressure up on the upper (apply) surface of the clutch piston the ball is forced against a side of the seat which has a cross-sectional diameter which conforms to a surface of a spherical ball preventing hydraulic fluid to pass therethrough. Thus, a unidirectional valve through the clutch piston is established.

The hole has a stepped configuration having a larger diameter immediately adjacent the upper surface of the clutch piston for proper location of the seat and for easy access of the hydraulic fluid to the hole within which the seat is located. Efficient formation of this stepped hole is achieved through the use of a stepped drill bit having a lesser diameter near a tip of the drill bit and having a greater diameter above a secondary lip of the drill bit. A separate drill bit is used for each type of clutch piston modification. Thus, a forward drill bit is utilized to form the appropriate hole in the forward clutch piston and the direct drill bit is utilized to form an appropriate hole in the direct clutch piston.

Once the clutch piston has been modified to include the ball and seat, the hole located within the clutch drum must be drilled out and plugged utilizing a plug having a diameter similar to the diameter of the hole within which the check ball resides in the clutch drum.

OBJECTS OF THE INVENTION

Accordingly, it is a primary object of the present invention to provide a work holder for facilitating the precise location of a hole within a clutch piston which then receives a ball and cage assembly for the passage of hydraulic fluid therethrough.

Another further object of the present invention is to provide a work holder which can hold various clutch pistons from the same or different automatic transmissions with little adjustment to the work holder.

Another further object of the present invention is to provide a drill bit guide on the work holder which has a sleeve of hardened material which directs the drill bit to a precise location on a clutch piston where a hole is desired.

Another further object of the present invention is to provide a drill bit which has a stepped configuration allowing the drill bit to form a hole having two separate diameters.

Another further object of the present invention is to provide a base of the work holder which securely holds various different drill bit guides for modification of various different clutch pistons.

Another further object of the present invention is to provide a work holder with a central disk for holding down a clutch piston to the work holder in a rigid fashion which has two separate contours which conform to the contours of two separate clutch pistons.

Another further object of the present invention is to provide a clutch piston which has a hole with a cage and check ball located therein which allows hydraulic fluid to pass to the apply side of the clutch piston without passing through the clutch drum.

Another further object of the present invention is to provide a method for modifying an automatic transmission having a check ball prone to failure within a hole, by plugging the hole and providing a new check ball placed within a new hole such that failure is less likely.

Another further object of the present invention is to provide an automatic transmission which includes a check ball within a clutch piston thereof such that if the check ball fails the automatic transmission is more easily and cheaply repaired.

Another further object of the present invention is to provide a work holder which is of durable construction having a structure which lends itself to mass production techniques.

Another further object of the present invention is to provide a work holder which is easily utilizable by transmission repair personnel.

Viewed from a first vantage point it is an object of the present invention to provide a device for modifying automatic transmission clutch pistons comprised of a base having an upper surface which supports the clutch piston, a clutch piston retention means for securely holding the clutch piston to said base, and a plurality of drill bit guides each having a hollow cylindrical sleeve, said drill bit guide mountable to said base in an orientation providing said sleeve in a position adjacent a portion of the clutch piston to be drilled; whereby the clutch piston is securely held relative to said sleeve facilitating drilling of a precisely located hole in the clutch piston.

Viewed from a second vantage point it is an object of the present invention to provide a method for modifying an automatic transmission having clutch drums with check balls formed therein and clutch pistons without any check balls formed therein including steps of drilling a hole through the clutch piston, placing a cage securely within the hole having a spherical ball held therewithin by a plurality of retainer projections on an apply side and a conically tapering sidewall on an opposite side, and plugging a hole receiving the check ball in the clutch drum; whereby hydraulic fluid is directed to the apply side of the clutch piston through the clutch piston rather than through the clutch drum.

Viewed from a third vantage point it is an object of the present invention to provide an apparatus for utilizing hydraulic pressure to do work comprised of a first boundary having a fluid transmitting hole, a plug occluding said hole to prevent fluid flow therethrough, a second boundary having a unidirectional fluid transmitting valve therein, the two boundaries defining the region therebetween, said unidirectional valve preventing fluid flow through said second plate out of the region, and a fluid inlet providing fluid access into the region.

These and other objects will be made manifest when considering the following detailed specification when taken in conjunction with the appended drawing figures.

BRIEF DESCRIPTION OF THE DRAWINGS

FIG. 7 is an exploded isometric view of a portion of that which is shown in FIG. 1.

FIG. 8 is a detail of that which is shown in FIG. 9 including additional details.

FIG. 9 is a sectional view similar to that which is shown in FIG. 3 except that various parts are removed and a different clutch piston is located therewith.

FIG. 10 is a detail of that which is shown in FIG. 9 with additional structure included therein.

DESCRIPTION OF THE PREFERRED EMBODIMENT

Figure 1:
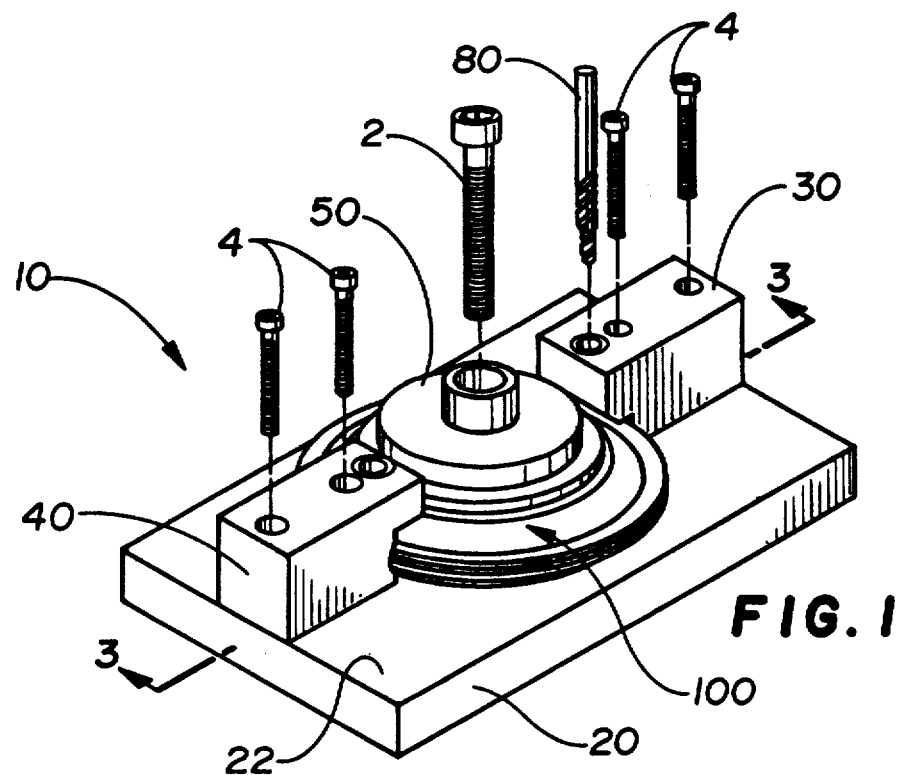
FIG. 1 is a perspective view of the device of this invention with an automatic transmission clutch piston included thereon and portions of the device exploded to reveal further details.
Figure 2:
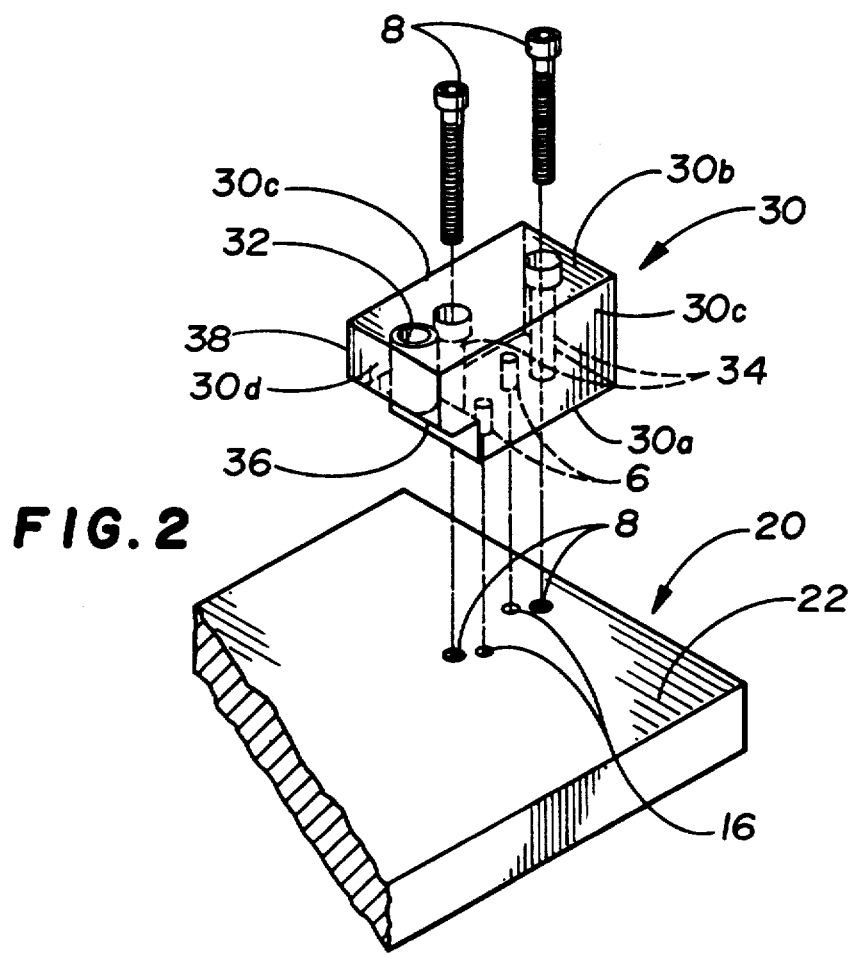
FIG. 2 is an exploded isometric view of a portion of that which is shown in FIG. 1 with hidden lines revealing further structural detail of the device.

Referring now to the drawings wherein like numerals represent like parts throughout, reference numeral 10 is directed to a work holder for modifying a pair of clutch pistons 100, 150 of an automatic transmission. FIG. 1 shows the work holder 10 with most of its parts displayed.

In its essence, the work holder 10 includes a base 20 which supports a forward drill bit guide 30 and a direct drill bit guide 40. The forward drill bit guide 30 has a sleeve 32 which aligns a forward drill bit 80. The direct drill bit guide 40 has a sleeve 42 which aligns a direct drill bit 90 (FIG. 8). A central disk 50 is fastened to the base 20 through a central recess 26 (FIGS. 3 and 9) formed in an upper surface 22 of the base 20. The central disk 50 holds the forward clutch piston 100 while drilling of the forward clutch piston 100 occurs with the forward drill bit 80. The central disk 50 also holds the direct clutch piston 150 while drilling of the direct clutch piston 150 occurs with the direct drill bit 90 (FIG. 9).

More specifically, and referring to FIGS. 1, 2, 3, 7 and 9, the base 20 is an orthothrombic parallelopiped having a horizontal upper surface 22 and a horizontal bottom surface 24. The upper surface 22 and bottom surface 24 form the largest planes of the orthothrombic base 20.

A central recess 26 is located near a geometric center of the upper surface 22 of the base 20. The central recess 26 is cylindrical in shape with a flat lower surface 26a parallel to the upper surface 22 of the base 20. Curved side walls of the central recess 26 are oriented orthogonal to the upper surface 22. A threaded hole 28 is centrally located in the lower surface 26a of the central recess 26. The threaded hole 28 passes from the lower surface 26a of the central recess 26 through to the bottom surface 24 of the base 20.

Figure 3:
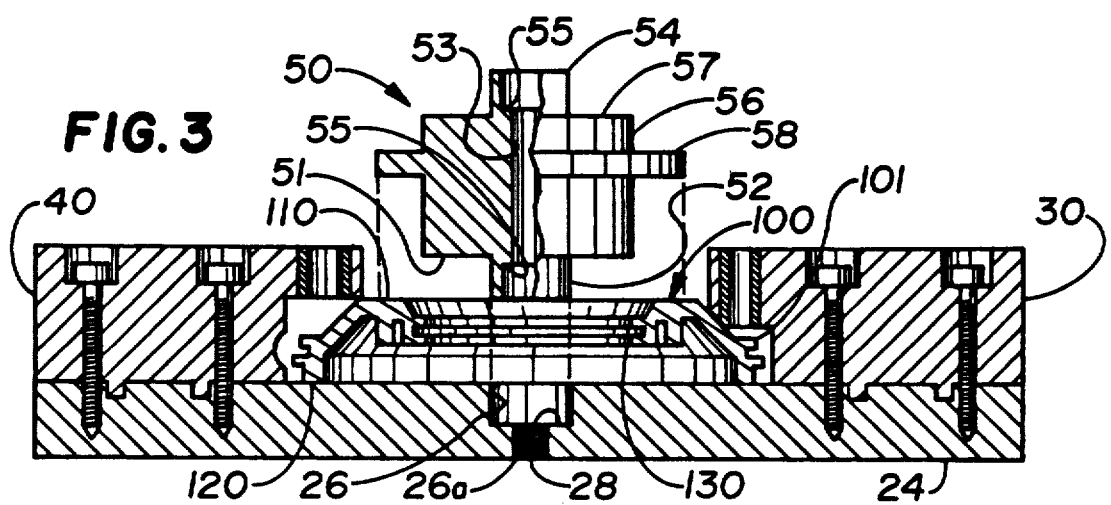
FIG. 3 is a sectional view of that which is shown in FIG. 1 taken along line 3—3 of FIG. 1.

Referring now to FIGS. 1, 3 and 9, details of the central disk 50 are shown. The central disk 50 is preferably a radially symmetrical, substantially cylindrical unitary mass. Thus, the central disk 50 includes a first flat end 51 and second flat end 57 in parallel planes on opposite sides thereof with an orthogonally formed curving cylindrical side wall 56 interposed therebetween. A central bore 53 passes through an axial geometric center of the central disk 50. The central bore 53 extends perpendicularly from the first flat end 51 through to the second flat end 57.

A first bolt shroud 52 forms a cylindrical wall around the central bore 53 which extends perpendicularly from the first flat end 51. A second bolt shroud 54 extends perpendicularly from the second flat end 57 in a cylindrical fashion surrounding the central bore 53 in a manner similar to that of the first bolt shroud 52. Each bolt shroud 52, 54 has an inner diameter greater than a diameter of the central bore 53. Thus, a bolt shelf 55 is located along each flat end 51, 57 within each shroud 52, 54. The bolt shelf 55 can receive a head on an attachment bolt 2 thereagainst to hold the central disk 50 from vertical translation.

An outer diameter of each shroud 52, 54 is of similar size to a diameter of the central recess 26 of the base 20. Furthermore, a length of the shrouds 52, 54 is similar to a depth of the central recess 26. Thus, the central disk 50 may be located over the base 20 with one of the shrouds 52, 54 within the central recess 26 such that one of the flat ends 51, 57 is adjacent the upper surface 22 of the base 20 while an end of the shroud 52, 54 can rest on the lower surface 26a within the central recess 26.

An annulus 58 forms an annular ring which extends radially outwardly from the cylindrical side walls 56 of the central disk 50 in a plane perpendicular to the cylindrical side walls 56. The annulus 58 is rectangular is cross-section such that the annulus 58 has sides which are parallel to the first flat end 51 and the second flat end 57. Thus, when the central disk 50 is located adjacent the base 20, the annulus 58 is oriented in a plane parallel to a plane defined by the upper surface 22 of the base 20. The central disk 50 is primarily utilized to hold either the direct clutch piston 150 or the forward clutch piston 100 securely to the base 20. The central disk 50 has a first profile comprised of the annulus 58, the side surface 56, and the first flat end 51 which holds the forward clutch piston 100. The central disk 50 has a second profile comprised of the annulus 58, the side surface 56, and the second flat end 57 which holds the direct clutch piston 150.

FIGS. 1 and 3, show the forward clutch piston 100 being secured to the base 20. In its essence, the forward clutch piston 100 is a substantially radially symmetrical, ring-like construct having a top surface 110 and a bottom surface 120. A central bore 130 is located at an axial geometric center of the forward clutch piston 100. The top surface 110 slopes down along an intermediate slope 140 (FIG. 4) to a lower flat plateau 142 forming a periphery of the top surface 110.

To secure the forward clutch piston 100 to the base 20, the forward clutch piston 100 is first located directly over the central recess 26 of the base 20. The central disk 50 is then located within the central bore 130 of the forward clutch piston 100 with the first bolt shroud 52 residing within the central recess 26. A diameter of the cylinder side wall 56 is similar in size to a diameter of the central bore 130 of the forward clutch piston 100. The annulus 58 is located a distance from the first flat end 51 equal to a distance from the top surface 110 of the forward clutch piston 100 to the bottom surface 120 of the forward clutch piston 100. Thus, when the central disk 50 is placed within the forward clutch piston 100, the annulus 58 is adjacent the top surface 110 and the first flat end 51 is adjacent the upper surface 22 of the base 20. In this configuration, the forward clutch piston 100 is securely restrained from horizontal motion relative to the base 20.

The central disk attachment bolt 2 (shown in FIG. 1) is sized to be receivable within the central bore 53 of the central disk 50 and also to thread within the threaded hole 28 of the central recess 26. With the disk attachment bolt 2 in place within the central bore 53 of the central disk 50 and threaded into the threaded hole 28 of the central recess 26, the forward clutch piston 100 is restrained from motion vertically. Thus, the forward clutch piston 100 is securely attached to the base 20.

The direct clutch piston 150 is also similarly attachable to the base 20 as is shown in FIG. 9 by merely inverting the disk 50 and securing it with bolt 2. In its essence, the direct clutch piston 150 is an annular ring like construct having a top surface 160 along an outermost edge thereof and a recessed inner top surface 162 (FIGS. 8 and 10) on an innermost upper surface thereof. The direct clutch piston 150 also has a bottom surface 170 (FIG. 10) which has bottom surface spring posts 172 (FIGS. 8 and 9) extending therefrom. A central bore 180 is located concentrically with a central axis of the direct clutch piston 150.

The direct clutch piston 150 is attached to the base 20 as shown in FIG. 9 in the following manner. Initially, the direct clutch piston 150 is located directly over the central recess 26 of the base 20 with the top surface 160 facing upwards and with the bottom surface spring posts 172 resting on the upper surface 22 of the base 20. The central disk 50 is then located within the central bore 180 of the direct clutch piston 150. The cylindrical side walls 56 of the central disk 50 have a diameter similar in size to a diameter of the central bore 180.

The central disk 50 is oriented within the central bore 180 of the direct clutch piston 150 with the second flat end 57 facing downward and adjacent the upper surface 22 of the base 20. Thus, the central disk 50 is oriented 180° opposite from its orientation while fastening the forward clutch piston 100 to the base 20. A distance from the annulus 58 to the second flat end 57 of the central disk 50 is preferably equal to a distance between the recessed inner top surface 162 (FIGS. 8 and 10) of the direct clutch piston 150 and the bottom surface spring posts 172 of the direct clutch piston 150. Thus, when the central disk 50 is located within the central bore 180 of the direct clutch piston 150, the annulus 58 is adjacent the recessed inner top surface 162 of the direct clutch piston 150 and the second flat end 57 of the central disk 50 is adjacent the upper surface 22 of the base 20.

The second bolt shroud 54 is located within the central recess 26 in this configuration. Thus, the direct clutch piston 150 is restrained from horizontal motion. The disk attachment bolt 2 may be placed through the central bore 53 of the central disk 50 and tightened into the threaded hole 28 of the central recess 26 to restrain the direct clutch piston 150 from vertical motion.

Referring now to FIGS. 2 through 5, details of the forward drill bit guide 30 are shown. The forward drill bit guide 30 is primarily an orthothrombic parallelopiped having a bottom surface 30a which is locatable adjacent the upper surface 22 of the base 20. The forward guide 30 has an upper surface 30b parallel to its lower surface 30a. Two cylindrical bolt receiving holes 34 extend between the upper surface 30b and the lower surface 30a of the forward drill bit guide 30. The base 20 has two threaded holes 8 located vertically through the upper surface 22 thereof which are positioned directly below the two bolt receiving holes 34 of the forward drill bit guide 30. Thus, drill bit guide attachment bolts 4 may be placed through the bolt receiving holes 34 to fasten the forward drill bit guide 30 to the base 20.

The two threaded holes 8 located in the base 20 are in a line collinear with the central recess 26. The bolt receiving holes 34 are preferably an equal distance away from two opposite side surfaces 30c of the forward drill bit guide 30. Thus, the forward drill bit guide 30 is primarily aligned in a plane which includes the central recess 26 therein. Two cylindrical posts 6 extend orthogonally from the bottom surface 30a of the forward drill bit guide 30. Preferably, these posts 6 are not within the plane including the bolt receiving holes 34.

Two alignment holes 16 are formed in the upper surface 22 of the base 20 in a configuration and with a size capable of securely receiving the posts 6 therein.

An end surface 30d of the forward drill bit guide 30 facing the central recess 26 has an overhang 38 which causes the upper surface 30b of the forward drill bit guide 30 to extend further toward the central recess 26 than does the bottom surface 30a of the forward drill bit guide 30. A cylindrical hole is positioned vertically through the overhang 38. This cylindrical hole receives a bearing sleeve 32 which is a cylindrical hollow construct. With the sleeve 32 in place within the overhang 38, a hole in the sleeve 32 remains which is oriented vertically perpendicular to the upper surface 22 of the base 20.

The hole within the sleeve 32 is located and sized such that when the forward clutch piston 100 is secured in place on the base 20, the hole within the sleeve 32 is directly above an impact point 101 on the forward clutch piston 100 through which a forward drill bit 80 is to be directed (for reasons which will be amplified). The sleeve 32 is preferably made from a hardened material which allows the forward drill bit 80 to rotate freely therewithin without affecting the rigidity or dimensions of the sleeve 32.

Figure 4:
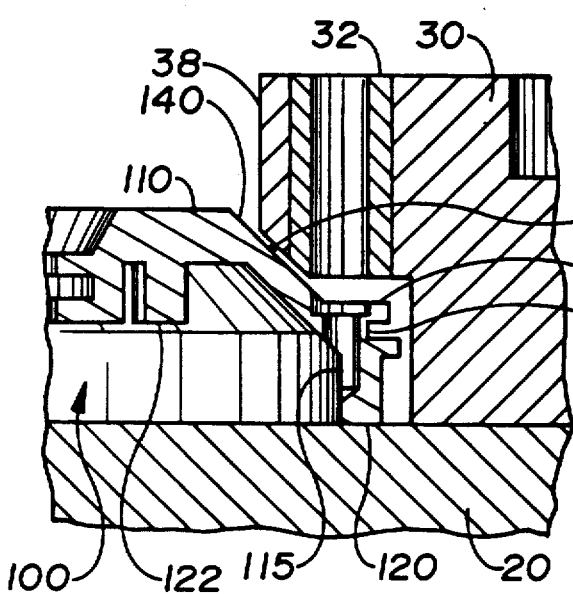
FIG. 4 is a sectional view of a portion of that which is shown in FIG. 3.
Figure 5:
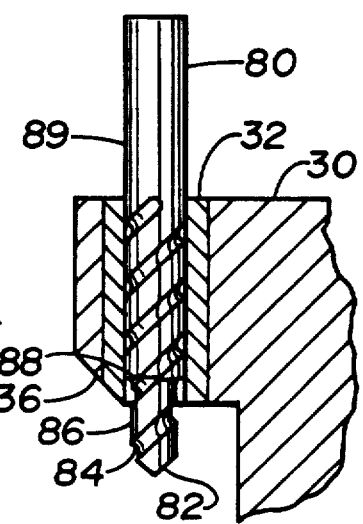
FIG. 5 is a detail of that which is shown in FIG. 4 including additional details.

A lower corner of the overhang 38 is truncated with a bevel 36 (FIG. 4). The bevel 36 allows the overhang 38 to be of additional length without interfering with the forward clutch piston 100 and to allow the sleeve 32 to align the forward drill bit 80 as effectively as possible.

The forward drill bit 80 (shown in FIG. 5) is a stepped drill bit which includes a tip 82 at a lower end thereof. Extending spirally upwards from the tip 82 is a flute 84 and a body 86. A secondary lip 88 defines a transition between a lower portion of the forward drill bit 80 having a lesser diameter and an upper portion of the forward drill bit 80 having a greater diameter. Above the secondary lip 88 are located additional flute portions 84 and body portions 86 which lead up to a neck 89. The neck 89 is receivable in any of a variety of drilling machinery, but preferably is captured by a drill press (not shown).

When the forward clutch piston 100 is secured in place upon the base 20 with the central disk 50 holding the forward clutch piston 100 securely to the base 20, the forward drill bit 80 impacts the forward clutch 100 preferably at a junction between its intermediate slope 140 and its plateau 142. The forward drill bit 80 is than allowed to bore into the forward clutch piston 100 under the secondary lip 88 passes a short distance into the forward clutch piston 100.

The forward drill bit 80 is shaped such that when the secondary lip 88 passes slightly into the forward clutch piston 100, the lower portion of the forward drill bit 80 will have bored a hole which passes through to an underside of the forward clutch piston 100, but will be short of the bottom surface 120. Thus, a passageway 115 (FIG. 4) is formed passing from the top surface 110 through to the underside. This passageway 115 is characterized by having an initial upper diameter which is slightly greater than a lower, lesser diameter portion. A circular corner 117 (FIG. 6B) defines a junction between the greater diameter portion and a lesser diameter portion.

The width and location of the passageway 115 are carefully selected with a variety of parameters in mind. These parameters include the rate of hydraulic fluid flow desired and the available distance between the intermediate slope 140 and an inside wall 144 of an outer groove 124 contained between outer seal lips 126 of the forward clutch piston 100 which receives an outer groove seal therein. Also, it is generally desirable to have the passageway 190 located radially as far away as possible from a central axis of the forward clutch piston 100.

Figure 6A:
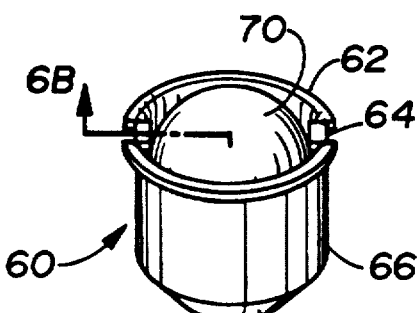
FIG. 6A is an isometric view of a portion of the device of this invention.
Figure 6B:
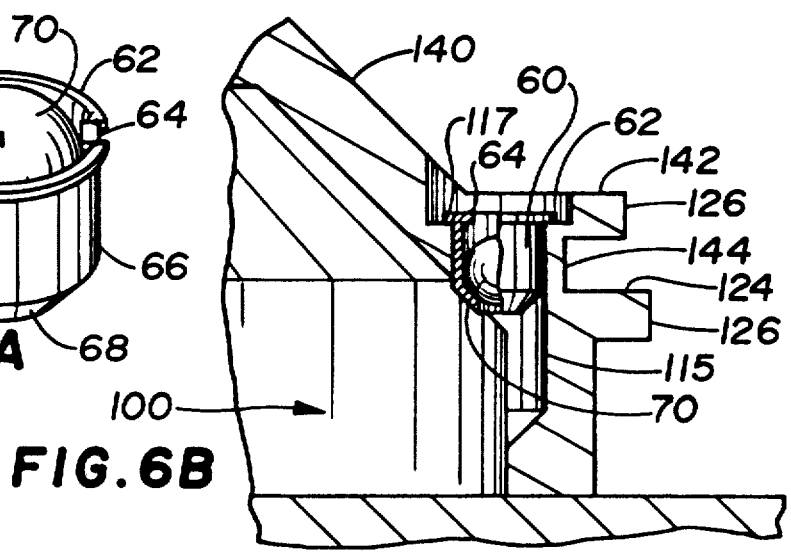
FIG. 6B is a sectional view of a portion of that which is shown in FIG. 4 with additional structure included therein.
Figure 15:
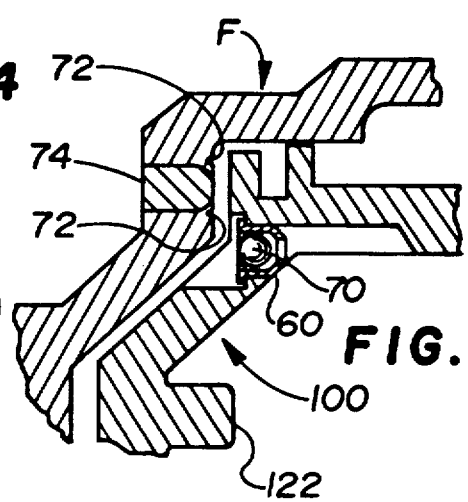
FIG. 15 is a view of that which is shown in FIG. 13 after the modification of this invention.

Once the passageway 115 has been formed, the forward drill bit 80 is backed out of the passageway 115. The function of the work holder 10 with respect to the forward clutch piston 100 is then complete. Further modifications to the forward clutch piston 100 include press fitting a check ball 70 and seat 60 which together comprise a unidirectional valve, into the passageway 115. Details of the seat 60 and check ball 70 and their location in the forward clutch piston 100 are shown in figures 6A, 6B and 15.

The seat 60 is primarily a hollow cylindrical construct having an upper lip 62 along an upped edge thereof nearer to the top surface 110 of the forward clutch piston 100 and two retainers 64 on opposite sides of an upper end thereof. A cylindrical side wall 66 defines sides of the seat 60 and a conical side wall portion 68 defines a lower end of the cylindrical seat 60. The conical side wall 68 has a tapering diameter which begins at the cylindrical side wall 66 and ends with a circular opening at a lower end of the conical side wall 68. The circular opening is oriented nearer the bottom surface 120 of the forward clutch piston 100.

The check ball 70 is a solid spherical ball having a diameter slightly less than an inside diameter of the cylindrical side wall 66 and slightly greater than the diameter of the opening of the conical side wall 68. The diameter of the check ball 70 is also slightly greater than a distance between the retainers 64. Thus, when the check ball 70 is in an upper position adjacent the retainers 64, fluid may pass freely around side edges of the check ball 70, but when the check ball 70 is in a lower orientation (i.e., adjacent the conical side wall 68) no fluid is allowed to pass.

The outer surface of the conical side wall 68 has a diameter substantially similar to a diameter of the passageway 115 of the forward clutch piston 100 in its lower portion. The upper portion of the passageway 115 has a diameter slightly greatly than an outer diameter of the upper lip 62 of the seat 60. Thus, the seat 60 will check ball 70 entrapped therewithin may be friction fitted into the passageway 115 with the upper lip 62 adjacent the corner 117 of the passageway 115. This orientation is shown in FIG. 6B and FIG. 15. With the check ball 70 and seat 60 in place within the forward clutch piston 100, hydraulic fluid may pass from the bottom surface 120 of the forward clutch piston 100 to the top surface 110 of the forward clutch piston 100, but may not pass from the top surface 110 of the forward clutch piston 100 to the bottom surface 120 of the forward clutch piston 100.

A further modification to accompany the ball 70 and seat 60 within the forward clutch piston 100 involves locating a plug 74 (FIGS. 13 and 15) into a cylindrical hole 76, existing within a forward clutch drum F of the automatic transmission. The plug 74 is friction fitted into the hole 76 after the hole 76 is drilled out to a constant diameter. Once the plug 74 is in place within the hole 76, the automatic transmission may be reassembled with the thusly modified forward clutch piston 100. The automatic transmission may then be utilized in the modified configuration. Further details of the modification to the automatic transmission are described below.

Referring now to FIGS. 7 through 10, details of the direct drill bit guide 40 and modification of the direct clutch piston 150 are described. Many primary features of the direct drill bit guide 40 are similar to those of the forward drill bit guide 30 and will not be belabored in excessive detail. The direct drill bit guide 40 has two bolt receiving holes 44 similar to the bolt receiving holes 34 of the forward drill bit guide 30.

The base 20 has two threaded holes 8 located collinearly with the central recess 26. The threaded holes 8 attach the direct drill bit guide 40 to the base 20. Thus one of the pairs of threaded holes 8 is located on each side of the central recess 26. The bolt receiving holes 44 of the direct drill bit guide 40 are located such that a guide attachment bolt 4 may pass through each bolt receiving hole 44 and into the threaded holes 8. In this manner, the direct drill bit guide 40 may be securely attached to the upper surface 22 of the base 20. Posts 6 similar to the posts 6 of the forward drill bit guide 30 extend from the bottom surface of the direct drill bit guide 40 and into corresponding alignment holes 16 located in the upper surface 22 of the base 20.

A side of the direct drill bit guide 40 closest to the central recess 26 has an overhang 48 on an upper surface thereof which extends toward the central recess 26. Thus, an upper surface of the direct drill bit guide 40 extends closer to the central recess 26 than does a bottom surface of the direct drill bit guide 40. The overhang 48 includes therein a cylindrical hole which includes a sleeve 42 therein. The sleeve 42 has features similar to the sleeve 32 except an interior diameter of the sleeve 42 is sized to receive a direct drill bit 90 having dimensions dissimilar to those of the forward drill bit 80.

A lower portion of a wall of the direct drill bit guide 40 closest to the central recess 26 has a bight portion 46 forming an arcuate recess in the wall. When the direct drill bit guide 40 is in place on the base 20 and the direct clutch piston 150 is attached to the base 20 along with the central disk 50, the overhang 48 extends over a top surface 160 of the direct clutch piston 150. The bight portion 46 is recessed to provide clearance which allows portions of the direct clutch piston 150 (or forward clutch piston 100) to avoid impact with the direct drill bit guide 40.

The sleeve 42 is located such that a center of the sleeve 42 is directly above an impact point 151 on the direct clutch piston 150 through which the direct drill bit 90 is to be directed.

To perform the desired modification to the direct clutch piston 150, the direct drill bit 90 is passed through the sleeve 42 of the direct drill bit guide 40 while attached to an output shaft of a drilling device such as a drill press. The direct drill bit 90 includes a tip 92 on a lowermost portion thereof with a flute 94 and a body 96 extending spirally upwardly therefrom. A secondary lip 98 defines a transition to a greater diameter portion of the direct drill bit 90. Thus, the direct drill bit 90 is a stepped drill bit. The secondary lip 98 defines a lower edge of additional flute portions 94 and body portions 96 which extend up to a neck 99 of the direct drill bit 90. The neck 99 attaches to the output shaft of the drilling device.

As the direct drill bit 90 is lowered, a passageway 190 is formed passing through the top surface 160 to the bottom surface 170 (FIG. 10). The passageway 190 has a diameter similar to the diameter of the tip of the direct drill bit 90. The top surface 160 receives a cylindrical recess 197 caused by the secondary lip 98 of the direct drill bit 90. This cylindrical recess 197 extends only slightly into the top surface 160 of the direct clutch piston 150.

The width of the passageway 190 and location of the passageway 190 are carefully selected with a variety of parameters in mind. The parameters include the rate of hydraulic fluid flow desired and the available distance between walls of the passageway 190 and an inside wall 168 of an outer groove 164 contained between outer seal lips 166 of the direct clutch piston 150 which receives an outer groove seal therein. Also, it is generally desirable to have the passageway 190 located as far as possible radially away from a central axis of the direct clutch piston 150.

A corner 195 defines an intersection between the passageway 190 and the cylindrical recess 197 caused by the secondary lip 98 of the direct drill bit 90. This corner 195 fits adjacent the upper lip 62 of the seat 60 when the seat 60 and included check ball 70 are placed within the passageway 190. Details of the seat 60 and related parts are described hereinabove with respect to modifications to the forward clutch piston 100. Function of the seat 60 in the direct clutch piston 150 is similar to the function of the seat 60 and check ball 70 in the forward clutch piston 100.

Along with modification of the direct clutch piston 150, a plug 74 (FIGS. 12 and 14) is to be placed within a hole 78 located in the direct clutch drum D of the automatic transmission. The plug 74 is friction fitted into the hole 78 after the hole 78 is drilled out to a constant diameter. The location of the plug 74 within the hole 78 along with the location of the seat 60 and check ball 70 within the direct clutch piston 150 are shown together in FIG. 14.

Figure 11:
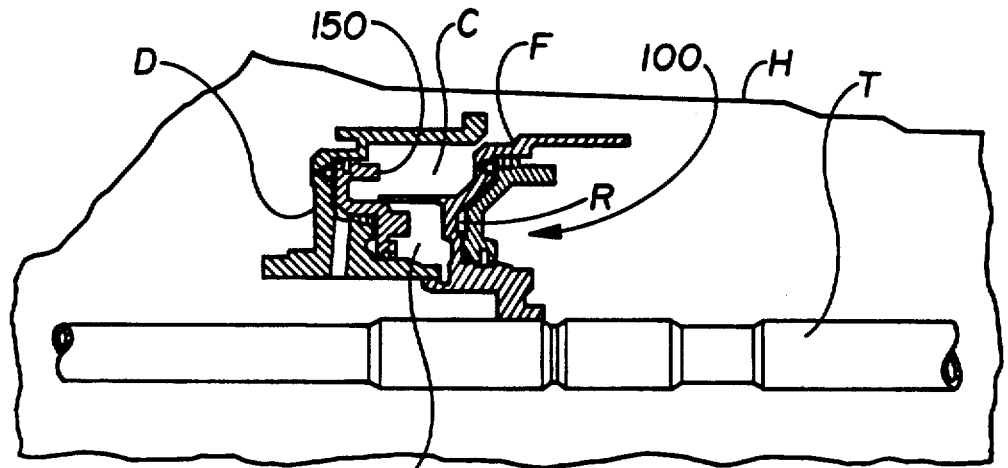
FIG. 11 is sectional view of a portion of an automatic transmission with only parts associated with this application included therein shown within their intended environment.

Referring now to FIGS. 11 through 15 together, the improved function of the automatic transmission with the modified clutch pistons 100, 150 installed are described in detail. FIG. 11 shows a portion of an automatic transmission having clutch pistons 100, 150 which fit adjacent to clutch drums D, F in a series arrangement surrounding a drive shaft T. Some automatic transmissions include a check ball 70 entrained within a hole 76, 78 in both the forward clutch drum F and the direct clutch drum D of the automatic transmission. The ball 70 is entrained such that fluid can flow easily toward the clutch pistons 100, 180 but is restrained from flowing way from the clutch pistons 100, 150. Note that this unidirectional valve is 180° reversed from the orientation of the seat 60 and ball 70 forming the improved unidirectional valve. One type of automatic transmission having this arrangement is the turbo hydro-matic 350 automatic transmission manufactured for use in General Motors vehicles.

A small recess R is located between the forward clutch piston 100 and the forward clutch drum F which is capable of filling with hydraulic fluid. As hydraulic fluid fills this recess R the forward clutch piston 100 is caused to move away from the forward clutch drum F and to engage a clutch (not shown) adjacent to the bottom surface 120 (FIG. 3) of the forward clutch piston 100, causing the clutch to activate and modify the power transmitted. In a similar manner, the direct clutch piston 150 and direct clutch drum D interact to activate a clutch (located in region C of FIG. 11) and modify the transmission of power within the automatic transmission when hydraulic fluid is placed between the direct clutch piston 150 and the direct clutch drum D.

Hydraulic pressure is increased primarily by a pump (not shown) which increases the hydraulic fluid pressure as motor velocity increases. Springs (not shown but located in regions in FIG. 11 among other places) are located adjacent to both the forward clutch piston 100 and the direct clutch piston 150 on sides opposite from the forward clutch drum F and the direct clutch drum D. The springs connect to the clutch piston 100, 150 through spring posts 122, 172 (FIGS. 4 and 8) and hold the clutch pistons 100, 150 adjacent to the clutch drums F, D until the hydraulic pressure creates a force which is greater than the force applied by the springs. When this point is reached, the clutch pistons 100, 150 involved are moved away from the clutch drums F, D causing a different gear ratio to be utilized for power transmission.

Figure 12:
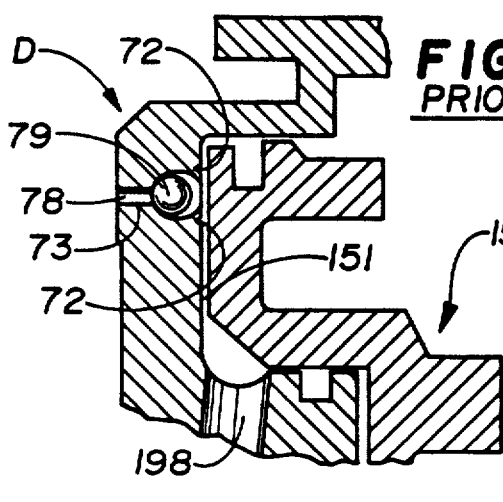
FIG. 12 is sectional view of a portion of that which is shown in FIG. 11 revealing the structure of that which is shown in FIG. 11 as it exists in the prior art.
Figure 13:
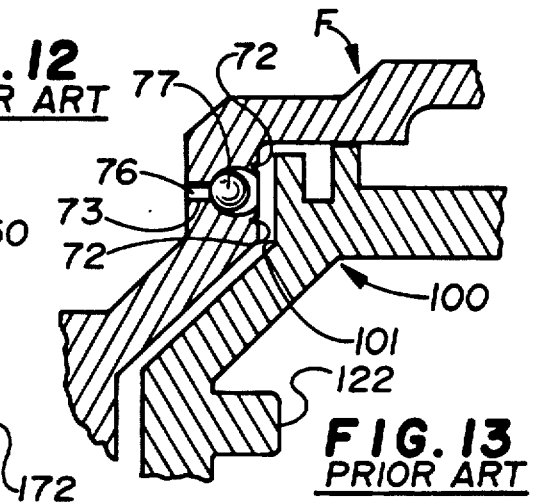
FIG. 13 is a detail of another portion of that which is shown in FIG. 11 revealing the structure of that which is shown in FIG. 11 as it exists in the prior art.

One method of hydraulic fluid access to the region between the clutch piston 100, 150 and the clutch drum F, D in an unmodified automatic transmission, as shown in FIGS. 11 through 13, is through the holes 76, 78 past the balls 77, 79. The ball is held in place by a staked portion 72 of the side wall of each hole 76, 78 which is caused to extend towards a center of the hole 76, 78 on a side of the hole 76, 78 adjacent the clutch piston 100, 150. This movement of the wall of the hole 76, 78 is usually caused by staking the hole 76, 78 with a tool which causes a portion of the side wall of the hole 76, 78 to be distressed and relocated closer to a center of the hole 76, 78.

Therefore, hydraulic fluid may pass from a side of the clutch drum F, D opposite the clutch piston 100, 150 through the hole 76, 78 and past the ball 77, 79. When sufficient hydraulic fluid passes past the ball 77, 79 to force the clutch piston 100, 150 away from the clutch drum F, D a different gear ratio is selected which decreases load on the engine causing the velocity of the engine to decrease and hydraulic pressure created by the pump to decrease which applies the clutch piston 100, 150.

The hole, 76, 78 has a necked down portion on a side distant from the clutch piston 100, 150 which the ball 77, 79 may contact, thereby sealing the fluid so that it cannot pass beyond the ball 77, 79. This prevents loss of the hydraulic pressure which applies the clutch piston 100, 150.

Hydraulic fluid is available to apply the clutch piston 100, 150 not only on a side of the clutch drum F,D opposite of the clutch piston 100, 150, but also on a side of the clutch piston 100, 150 opposite of the clutch drum F, D. Thus, while many automatic transmissions supply hydraulic fluid to activate clutch pistons 100, 150 from through the clutch drum F, D the hydraulic fluid can also be supplied to apply the clutch piston 100, 150 through the clutch piston 100, 150 itself.

Figure 14:
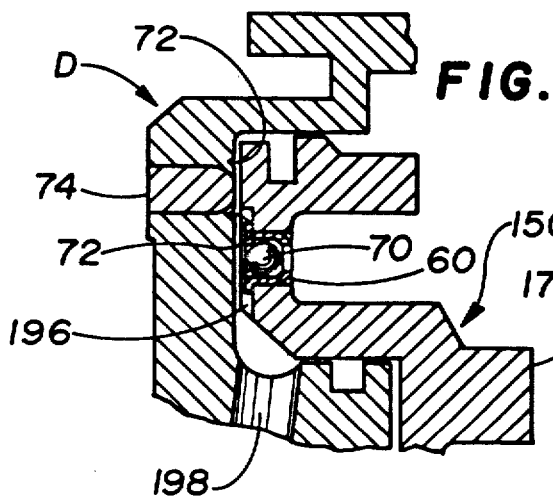
FIG. 14 is a view of that which is shown in FIG. 12 after the modification of this invention.

FIGS. 14 and 15 reveal the modification of the present invention. The plug 74 is placed within the hole 76, 78 of the clutch drum F, D and access is provided for hydraulic fluid through the clutch piston 100, 150. Inclusion of the seat 60 with the check ball 70 entrained therein decreases the likelihood of the check ball 70 blowing out into the region between the clutch piston 100, 150 and the clutch drum F, D during application of the clutch piston 100, 150. Without this modification (FIGS. 12 and 14) when significant hydraulic fluid is flowing past the ball 77, 79 forcing the ball 77, 79 against the staked portions 72 of the sides of the holes 76, 78 the ball 77, 79 has a tendency to break out the staked out portion 72.

Thus, the automatic transmission as modified (FIGS. 14 and 15) is less likely to experience failure through blow out of the ball 77, 79. Furthermore, if such a failure should occur after the modification shown in FIGS. 14, 15 and 16, the damaged part would be the clutch piston 100, 150 and not the clutch drum F, D. It is commonly the case within automatic transmissions that clutch drums are more expensive to replace than are clutch pistons. Thus, applicant's modification improves the automatic transmissions economically.

Referring now to FIGS. 8, 10 and 14 notice that the upper cylindrical recess 197 of the passageway 190 extends sufficiently toward a center of the direct clutch piston 150 to provide a fluid access 196 between the passageway 190 and the recessed inner top surface 162 of the direct clutch piston 150. This access 196 removes the need to direct fluid from an entrance 198 (FIGS. 12 and 14) within the direct clutch drum D entirely up to an uppermost edge of the top surface 160 of the direct clutch piston 150. The access 196 thus allows hydraulic fluid to more quickly pass into the Region R (FIG. 11) to close the ball 70 against the conical side wall 68 of the seat 60. This allows the direct clutch piston 150 to be more quickly applied resulting in faster gear shifting.

The direct clutch piston is utilized in many automatic transmissions to apply a clutch which engages what is often referred to as a "passing gear". This gear is utilized by a user of an automobile having an automatic transmission when the user applies extra gas to the engine while the automobile is traveling at a high rate of speed. This causes the automatic transmission to shift down to a lower gear and increases the available power from the engine for superior acceleration. With the access 196 allowing hydraulic fluid to more quickly apply the direct clutch piston 150, the passing gear is more quickly engageable providing additional safety and performance out of the automatic transmission.

The modification to the automatic transmission specifically contempleted herein is applicable to a variety of other hydraulic machinery. For instance, a basic hydraulic ram could be repaired or improved by plugging an existing one-way valve in one plate defining a region of hydraulic pressure application and locating a unidirectional valve in another plate defining the region. A damaged hydraulic component may thus be configured in a manner which is less likely to fail and exhibits improved performance.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A device for modifying automatic transmission clutch pistons, comprising, in combination:
   a base having an upper surface which supports the clutch piston,
   a clutch piston retention means for securely holding the clutch piston to said base, and
   a plurality of drill bit guides each having a hollow cylindrical sleeve, said drill bit guides mountable to said base in an orientation providing said sleeve in a position adjacent a portion of the clutch piston to be drilled;

whereby the clutch piston is securely held relative to said sleeve facilitating drilling of a precisely located hole in the clutch piston, wherein said clutch piston retention means has a first profile which conforms to a contour established by a first clutch piston while adjacent said base and a second profile which conforms to a second clutch piston while adjacent said base, whereby said clutch piston retention means secures either a first clutch piston or a second clutch piston to said base, wherein said first profile is on an end opposite said second profile, such that when said clutch piston retention means is oriented with said first profile on a lower side thereof the first clutch piston is securely retainable, and when said retention means is oriented with said second profile on a lower side thereof the second clutch piston is securely retainable, wherein said first profile includes a first shroud extending from an outermost surface thereof complemental to a recess formed in said upper surface of said base, such that when said retention means is located with said first profile adjacent contours of the first clutch piston, said first shroud is received within said recess, whereby horizontal movement of said first clutch piston is restrained; and wherein said second profile includes a second shroud extending from an outermost surface thereof complemental to said recess, such that when said retention means is located with said second profile adjacent contours of the second clutch piston, said second shroud is received within said recess, whereby horizontal movement of said second clutch piston is restrained.

2. The device of claim 1 wherein said recess includes a threaded hole extending below a bottom surface thereof and wherein said first shroud and said second shroud have cylindrical holes aligned with said threaded hole whereby a bolt is receivable through said first shroud or said second shroud and into said threaded hole, thereby restricting vertical movement of the first clutch piston or the second clutch piston.

3. A device for modifying automatic transmission clutch pistons, comprising, in combination:

a base having an upper surface which supports the clutch piston, a clutch piston retention means for securely holding the clutch piston to said base, and a plurality of drill bit guides each having a hollow cylindrical sleeve, said drill bit guides mountable to said base in an orientation providing said sleeve in a position adjacent a portion of the clutch piston to be drilled;

whereby the clutch piston is securely held relative to said sleeve facilitating drilling of a precisely located hole in the clutch piston, wherein said clutch piston retention means has a first profile which conforms to a contour established by a first clutch piston while adjacent said base and a second profile which conforms to a second clutch piston while adjacent said base, whereby said clutch piston retention means secures either a first clutch piston or a second clutch piston to said base, wherein said first profile includes a first shroud extending from an outermost surface thereof complemental to a recess formed in said upper surface of said base, such that when said retention means is located with said first profile adjacent contours of the first clutch piston, said first shroud is received within said recess, whereby horizontal movement of said first clutch piston is restrained; and wherein said second profile includes a second shroud extending from an outermost surface thereof complemental to said recess, such that when said retention means is located with said second profile adjacent contours of the second clutch piston, said second shroud is received within said recess, whereby horizontal movement of said second clutch piston is restrained.

* * * * *